United States Patent
Herlitz

(10) Patent No.: US 10,498,850 B2
(45) Date of Patent: Dec. 3, 2019

(54) CROSS-DOMAIN CONTEXT SHARING ENGINE

(71) Applicant: General Electric Company, Schenectady, NY (US)

(72) Inventor: Sten Herlitz, Boston, MA (US)

(73) Assignee: General Electric Company, Schenectady, NY (US)

( * ) Notice: Subject to any disclaimer, the term of this patent is extended or adjusted under 35 U.S.C. 154(b) by 227 days.

(21) Appl. No.: 15/385,453

(22) Filed: Dec. 20, 2016

(65) Prior Publication Data
US 2018/0176319 A1    Jun. 21, 2018

(51) Int. Cl.
| H04L 29/08 | (2006.01) |
| G06F 17/22 | (2006.01) |
| G06F 9/54 | (2006.01) |
| G06F 9/52 | (2006.01) |

(52) U.S. Cl.
CPC .......... *H04L 67/2823* (2013.01); *G06F 9/542* (2013.01); *G06F 17/227* (2013.01); *G06F 17/2247* (2013.01); *H04L 67/02* (2013.01); *G06F 9/52* (2013.01)

(58) Field of Classification Search
CPC ...... G06F 17/2247; G06F 17/227; G06F 9/52; G06F 9/542; H04L 67/2823; H04L 67/02
See application file for complete search history.

(56) References Cited

U.S. PATENT DOCUMENTS

| 8,458,612 | B2 * | 6/2013 | Chatterjee | G06F 3/04817 715/779 |
| 9,037,963 | B1 * | 5/2015 | Chandi | G06F 21/00 715/234 |
| 9,264,507 | B2 * | 2/2016 | Volchok | H04L 67/2823 |
| 9,384,026 | B1 | 7/2016 | Banga et al. | |
| 2012/0042261 | A1 * | 2/2012 | Phillips | G06F 9/542 715/744 |

OTHER PUBLICATIONS

International Search Report and Written Opinion for corresponding PCT application PCT/US2017/037621 dated Sep. 18, 2017; 12 pages.

(Continued)

*Primary Examiner* — Todd L Barker
(74) *Attorney, Agent, or Firm* — Christopher R. Carroll; The Small Patent Law Group, LLC

(57) ABSTRACT

Systems and techniques for provisioning context sharing artifacts between applications are presented. For example, as compared to conventional context sharing methods for sharing context information between two applications, the present innovations provide for eliminating the need for a Clinical Context Object Workgroup (CCOW) context manager. Modern applications are typically written in "zero-footprint" web technologies (pure HTML/JS/CSS) to avoid the need to install anything on users' computers. The only thing users have to have in order to access the application is a modern web browser. To synchronize context between two such web applications, a communication channel is required; but for security reasons the browser runs all applications in "sandboxed" mode which prevents the applications from communicating directly with the other browser applications or anything else on the local computer.

15 Claims, 7 Drawing Sheets

(56) References Cited

OTHER PUBLICATIONS

Mad Kristensen: "Iframe Cross Domain JavaScript Calls", Aug. 25, 2009; URL: https://madkristensen.net/post/iframe-cross-domain-javascript-calls [retrieved on Sep. 5, 2017].
Anonymous: "Cross Domain Iframe Content Load Detection", Stock Overflow, Apr. 28, 2015; URL: https://stackoverflow.com/questions/2754282/cross-domain-iframe-content-load-detection [retrieved on Sep. 5, 2017].
Benjamine Eidelman: "FrameProxy: Small Script to Proxy Cross-Domain Ajax Callbacks or Other Functions Thru a Hidden Iframe", Jun. 11, 2011; URL: https://github.com/benjamine/FrameProxy [retrieved on Sep. 5, 2017].

\* cited by examiner

CROSS-DOMAIN CONTEXT SHARING ENGINE

BACKGROUND

This invention relates to systems, methods, and computer program products relating to provisioning and sharing custom context sharing artifacts. More particularly, the invention creates a mechanism to share context among individual applications without the need for third-party solutions.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

In accordance with non-limiting implementation, a system includes a first browser component, a local browser storage component, a web server component, a second browser component and a second web server component.

In accordance with another non-limiting implementation, a computer readable storage device comprising instructions that, in response to execution, cause a system comprising a processor to perform operations, comprising: setting local storage properties, sending and receiving storage events, posting notification events, and sharing information.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, implementations, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
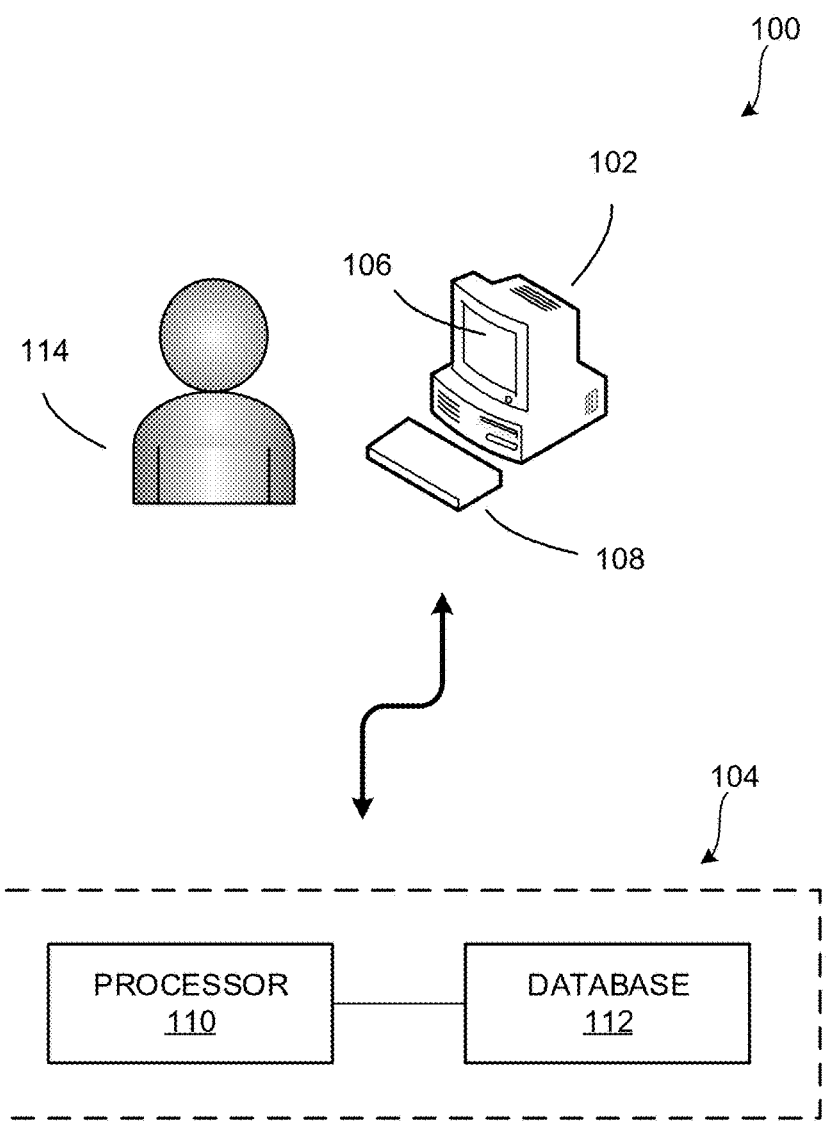
FIGS. 1-2 illustrate a high-level block diagram of an example cross-domain context sharing system, in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

Systems and techniques for provisioning context sharing artifacts between applications are presented. For example, as compared to conventional context sharing methods for sharing context information between two applications, the present innovations provide for eliminating the need for a Clinical Context Object Workgroup (CCOW) context manager. Modern applications are typically written in "zero-footprint" web technologies (pure HTML/JS/CSS) to avoid the need to install anything on users' computers. The only thing users have to have in order to access the application is a modern web browser. To synchronize context between two such web applications, a communication channel is required; but for security reasons the browser runs all applications in "sandboxed" mode which prevents the applications from communicating directly with the other browser applications or anything else on the local computer.

Referring initially to FIG. 1, there is illustrated an example system 100 that provides provisioning context sharing artifacts between applications, according to an aspect of the subject disclosure. The system 100 can be employed by various systems, such as, but not limited to modeling systems, simulation systems, enterprise solution systems, artificial intelligence systems, machine learning systems, neural network systems, and the like. Moreover, the system 100 and/or the components of the system 100 can be employed to use hardware and/or software to solve problems that are highly technical in nature (e.g., related to processing location data, related to location modeling, related to artificial intelligence, etc.), that are not abstract and that cannot be performed as a set of mental acts by a human.

System 100 includes a computer 102 and a cross domain context sharing engine 104 communicatively coupled to computer 102. In this example, computer 102 includes a user interface 106 and a data input (e.g., a keyboard, mouse, microphone, etc.) 108 and indoor geospatial site builder engine 104 includes a processor 110 and a database 112.

In certain aspects, user interface 106 displays data such as data and images received from cross domain context sharing engine 104. In certain aspects, user interface 106 receives commands and/or input from a user 114 via data input 108. In certain aspects where system 100 is used to provision context sharing artifacts, user interface 106 displays a clinical information, images, and other patient-related data.

Figure 2:
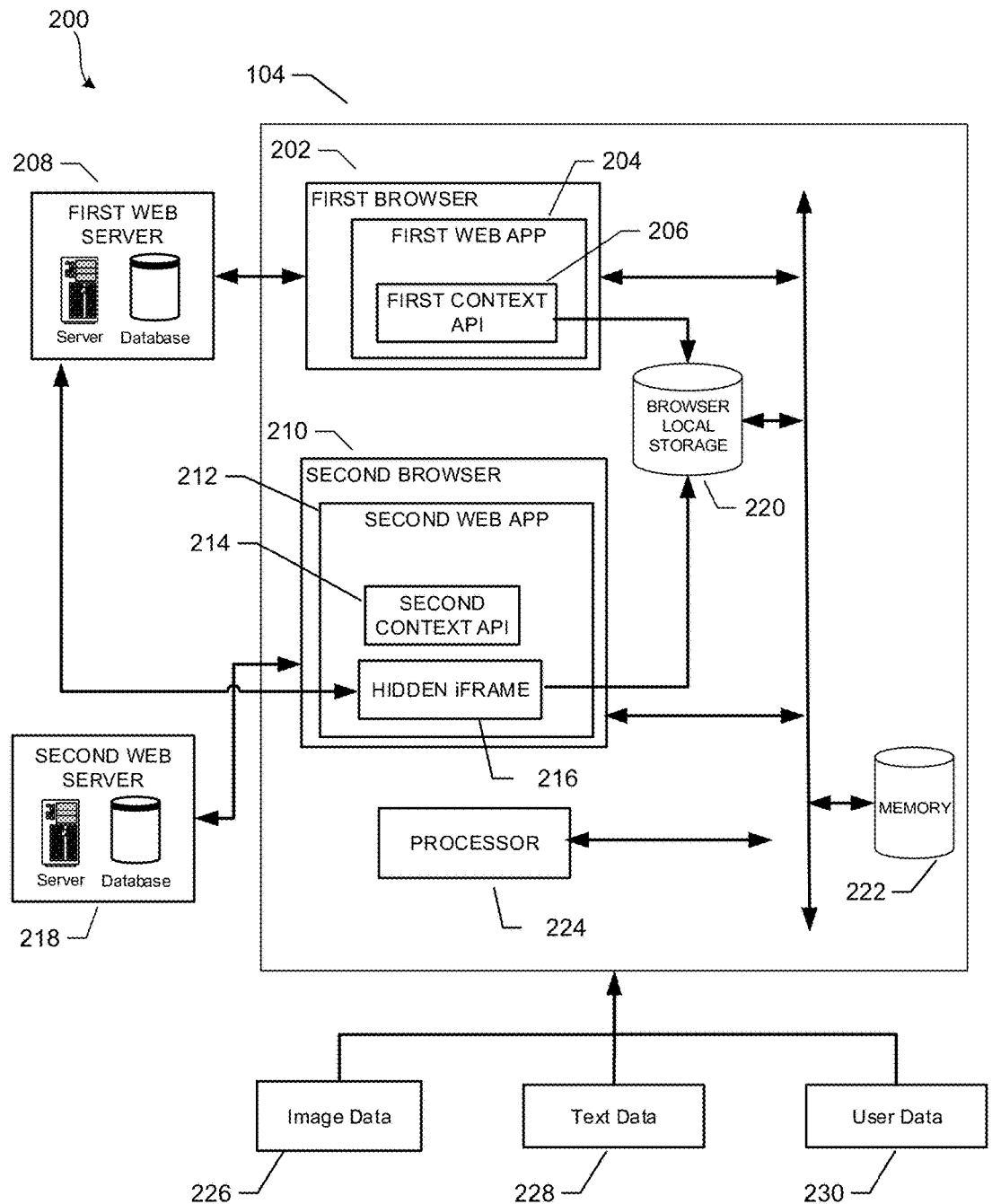

Referring to FIG. 2, cross-domain context sharing engine 104 can include a first browser component 202, a first web app component 204, a first context API component 206, a first web server component 208, a second browser component 210, a second web app component 212, a second context API component 214, a hidden iFrame component 216, a second web server component 218 and a local storage component 220. Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. The system 100 (e.g., the cross-domain context sharing engine 104) can include memory 222 for storing computer executable components and instructions. The system 100 (e.g., the cross-domain context sharing engine 104) can further include a processor 224 to facilitate operation of the instructions (e.g., computer executable components and instructions) by the system 100 (e.g., the cross-domain context sharing engine 104).

The cross-domain context sharing engine 104 can perform sending artifacts (e.g., from image data 226, text data 228, user data 230) from one application to another. In addition, cross-domain context sharing engine 104 can define attributes for each application (i.e., identifying patient, data type, etc.) as well as support management of the context sharing across applications. Cross-domain context sharing engine 104 functions to enable efficient cross-application workflows by automatically synchronizing common context subjects such as user and patient across the applications on a user's desktop, for example.

The first web server component 208 can provide the capabilities to retrieve, record and modify assets. In addition, first web server component 208 provides for processing and delivering web pages to client applications. The communication between client and server can take place using the Hypertext Transfer Protocol (HTTP). Pages delivered can be HTML documents, which may include images, style sheets and scripts in addition to text content. In certain aspects, first web server component 208 provides web services assets across multiple clients, servers, and facilities.

The first web application component 204 can be any web-based application which can retrieve, record, modify, and display clinical, image, or any other data, for example. The second web application component 212 can be any web-based application which can retrieve, record, modify, and display clinical, image, or any other data, for example. In certain aspects, cross-domain context sharing engine 104 can share information with a plurality of applications. In certain aspects, applications can contain hidden iFrames 216.

Cross-domain context sharing engine 104 can provide mechanisms to enable efficient cross-application workflows by automatically synchronizing common context subjects such as user and patient, for example, across multiple applications on a user's desktop. The user is spared the trouble of having to log in multiple time and look up the same patient for each application, for example. Typically, there is a central, coordinating piece called a Context Manger, a shared service that runs on the server-side. The CCOW standard is the most common context sharing mechanism, however, it is rather complex and costly. Furthermore, CCOW requires components to be installed on the desktop, and it requires an additional server. In addition, CCOW is an aging standard that was designed for native desktops, not modern browser applications. CCOW has compatibility issues with modern authentication mechanisms where single sign on (SSO) is handled directly by the browser via OAuth2/JWT tokens (or SAML).

Cross-domain context sharing engine 104 is a lightweight context sharing mechanism which avoids CCOW, thereby simplifying deployment and reducing cost. Context sharing can also be beneficial even for users who only have a single application, since it lets users have more than one instance open side-by-side (or on separate monitors) to view different parts of the application at the same time. This helps get around the 'one-view-at-a-time' limitation which most applications have, without requiring complex logic inside the application itself to support the native multi-view mode.

In certain aspects, cross-domain context sharing engine 104 can also be provided as a web component library that would dynamically insert the iframe when needed. In certain aspects, the library could also contain the html page required by the iFrame. In certain aspects, the application developers would simply have to make a "context.set(subject,val)" API call when setting context, and react to the "context.onchange" event when another application sets context. Each application can also offer a context "domain" configuration option, which can be set the same for all participating applications, for example.

Any context subject (not just User and Patient) can be communicated via the present mechanism. This can be beneficial since compatibility with modern browser-based SSO, applications typically want to get User information via an OAuth2/SAML JS library, since they cannot simply "trust" the User subject in a context-sharing mechanism, except when the new User value is null, which would tell the applications to log out. SSO mechanisms take care of auto-login when launching an application if the user has already logged into another application, but if the user has two logged-out applications and then logs into one of them, the SSO mechanism is not smart enough to also log the user into the other application. The present cross-domain context sharing engine 104 can solve this problem.

Figure 3:
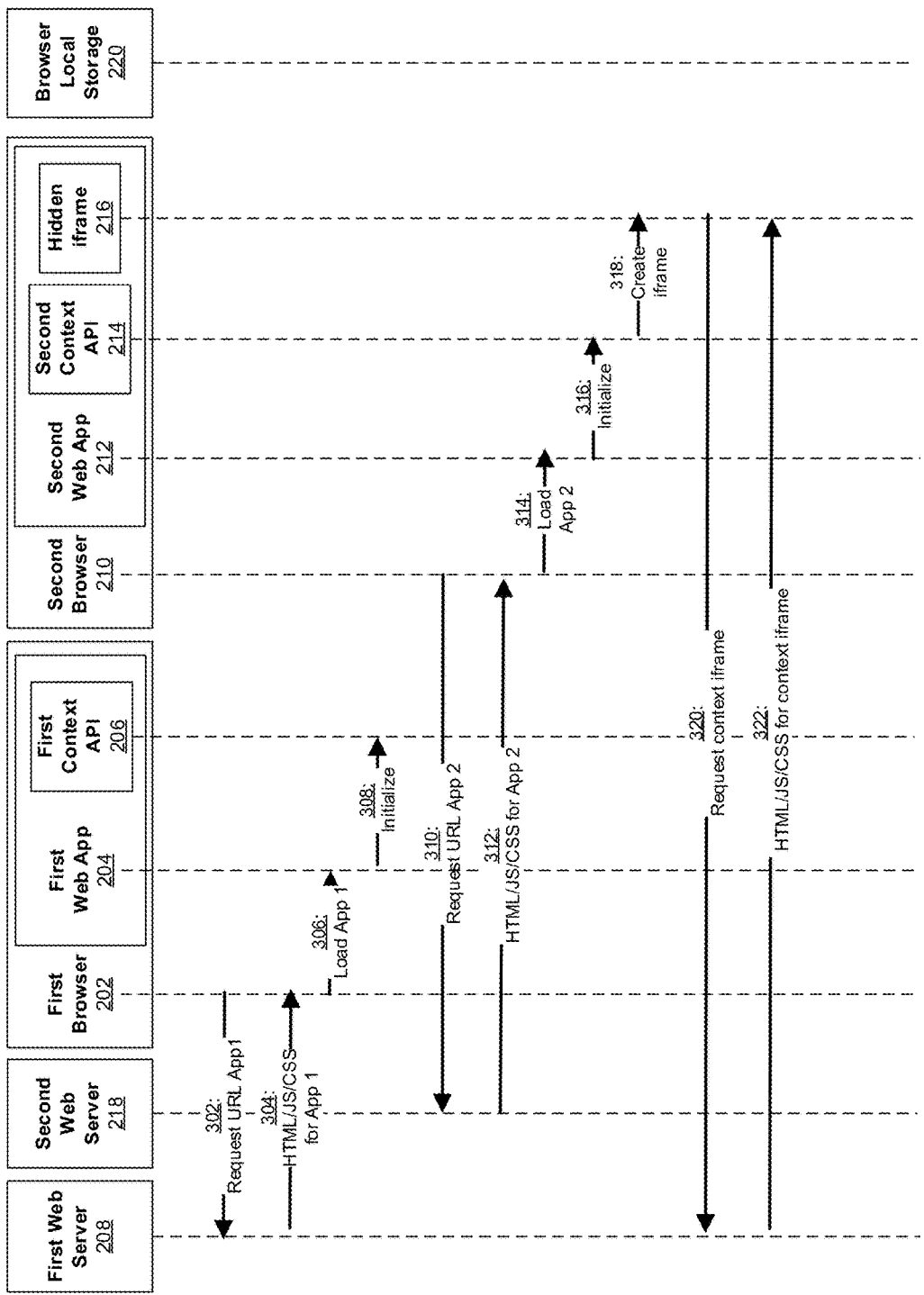
FIG. 3 illustrates a sequence diagram illustrating an example method of operating the system of FIG. 2 for cross-domain context sharing, according to the present disclosure.

Referring to FIG. 3, there is illustrated a non-limiting implementation of a system 100 in accordance with various aspects and implementations of this disclosure. In certain aspects, a user can launch first browser 202, to launch first web application 204. At message 302, first browser 202 can send request for a corresponding URL (e.g., http://app1.com) to first web application 204 from first web server 208. At message 304, first web server 208 can respond by sending HTML, Javascript (JS), and/or cascading style sheets (CSS) code for first web application 204 to first web browser 202. At message 306, first browser 202 then loads first web application 204. In certain aspects, first web application 204 can request additional HTML/JS/CSS files, such as from first context API 206 if the files are not already embedded on first web application 204. In certain aspects, first web application 204 can register an event listener for "onchange" events from first context API 206. At message 308, first web application 204 can initialize first context API 206 by assigning it to use the context domain (e.g., app1.com). First context API 206 can determine that the initialized domain is the same as the current domain and therefore can skip the creation of a hidden iframe (not shown) since it is not needed for cross-domain communication. First context API 206 can register an event listener for "storage" events from the browser's local storage 220 for the first domain (e.g. app1.com).

In certain aspects, a user can launch second browser 210 to launch second web application 212. At message 310, second browser 210 can send request for a corresponding URL (e.g. http://app2.com) to second web application 212 from second web server 218. Second web server 218 can respond by sending HTML, JS, and/or CSS code 312 for second web application 212 to second web browser 210. At message 314, second browser 210 then loads second web application 212. In certain aspects, second web application 212 can request additional HTML/JS/CSS files from second context API 214. Second web application 212 can register an event listener for "onchange" events from second context API 214. At message 316, second web application 212 can initialize second context API 214 by assigning it to use the context domain app1.com. At message 318, second context API 214 determines that the initialized domain is a different domain than the current domain and automatically creates hidden iframe 216. Second context API 214 can also register an event listener for "message" events from iframe 216. For security reasons, this event listener would be coded to only accept messages from the context domain (app1.com—the iframes domain). At message 320, iframe 216 can request a context HTML file from first web server 208. At message 322, first web server 208 can respond by sending the requested HTML file, which can include specifically generated code to allow for cross-domain communication. iframe 216 can register two event listeners, one for "message" events from the parent window, and one for "storage" events from browser local storage 220 for the app1.com domain.

Figure 4:
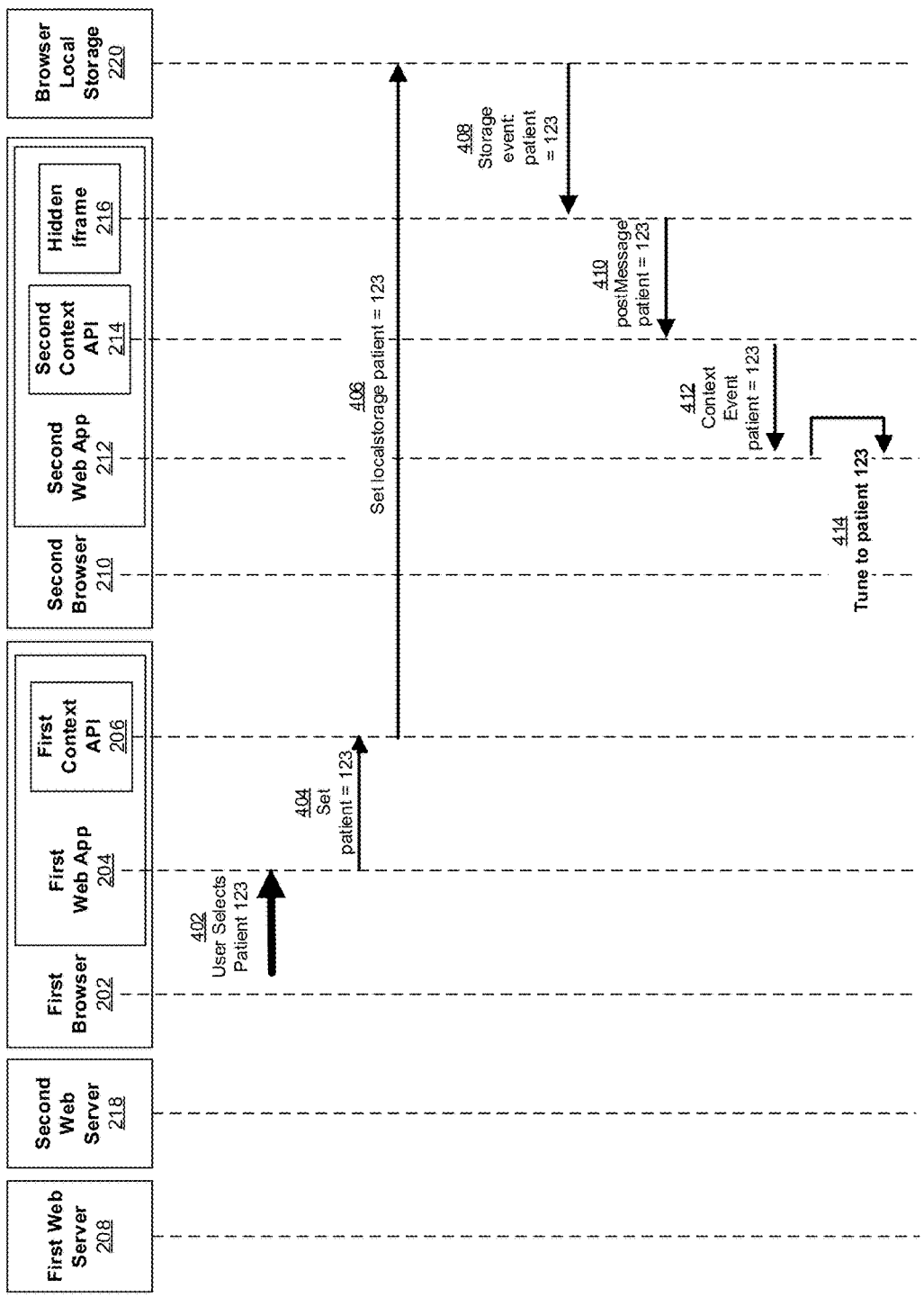
FIG. 4 illustrates a sequence diagram illustrating an example method of operating the system of FIG. 2 for cross-domain context sharing where the user sets the context on the first web application and the context is automatically set on the second web application, according to the present disclosure.

Referring now to FIG. 4, in certain aspects, changing context can be completed as follows. At 402, user selects patient with id=123 in first web application 204. At message 404, first web application 204 calls a method on first context API 206 to set the property "patient" key to 123. At message 406, first context API 206 inside first web application 204, having been instructed to operate on thee app1.com domain (not cross-domain), directly sets the property 'patient'=123 on the browsers local storage 220. At message 408, browser local storage 220 sends a "storage" event, reaching all open browser windows and iframes whose content originated from first web server 208 (app1.com domain). At message 410, the "storage" event listener in hidden iframe 216 in second web application 212 can receive the event which has the properties key=patient and newValue=123. Hidden iframe 216 propagates the message to its parent window via the postMessage method (since it cannot use a direct method call on the parent because the browser prevents cross-domain calls) which triggers "message" event on second browser window 210. At message 412, second context API 214 receives the event and notifies second web application 212 by sending an "onchanged" event. At message 414, upon receiving the "onchanged" event, second web application 212 examines the properties and determines that it is a change for the "patient" key, and that its new value is 123. Second web application 212 loads and displays this patient and is now in sync with first web application 204. Again, for security reasons, the iframe can be coded to accept only messages from the parent domain (second application 206).

Figure 5:
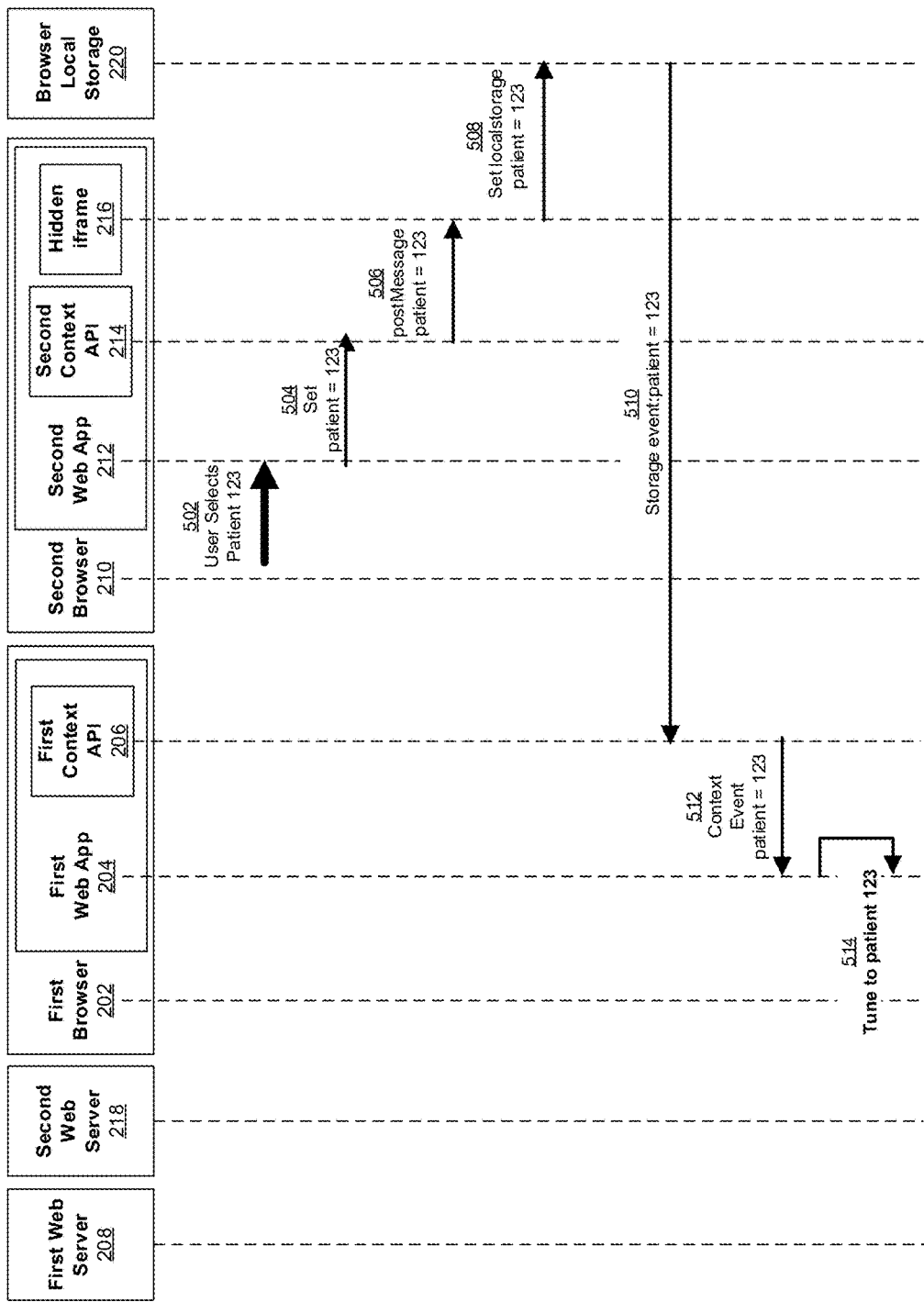
FIG. 5 illustrates a sequence diagram illustrating an example method of operating the system of FIG. 2 for cross-domain context sharing, where the user sets the context on the second web application and the context is automatically set on the first web application, according to the present disclosure.

In certain aspects, the whole flow works in reverse as well, but the role of iframe 216 is different. For example, if the user initiates the context change from the second web application 212, the iframe receives the message via a "message" event (triggered by a postMessage call from second context API 214) and propagates the message by setting the property on browser local storage 220, causing first application component 202 to be notified via a "storage" event. This is shown in FIG. 5. At 502, user selects patient with id=123 in second web application 212. At message 504, second web application 212 calls a method on second context API 214 to set the property "patient" key to 123. At message 506, second context API 214 inside second web application 212, propagates the message to its hidden iframe 216 via the postMessage method (since it cannot use a direct method call on the parent because the browser prevents cross-domain calls). At message 508, hidden iframe 216, sets local storage property patient=123 on browser local storage 220. At message 510, browser local storage 220 sends a "storage" event, reaching all open browser windows and iframes whose content originated from first web server 208 (app1.com domain). At message 512, first context API 206 receives the event and notifies first web application 204 by sending an "onchanged" event. At message 514, upon receiving the "onchanged" event, first web application 204 examines the properties and determines that it is a change for the "patient" key, and that its new value is 123. First web application 204 loads and displays this patient and is now in sync with second web application 212.

In certain aspects, a more "CCOW-like" flow can be supported. For example, an application can first ask to change context, and the other applications can have an opportunity to respond with "OK", or "OK+WarningMsg", or "No+RefusalMsg". In certain aspects, instead of directly setting the subject, the context could first set a "proposedSubject" and let the other applications respond by setting subjects such as "proposedSubjectResponseFromApp1", for example.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 6:
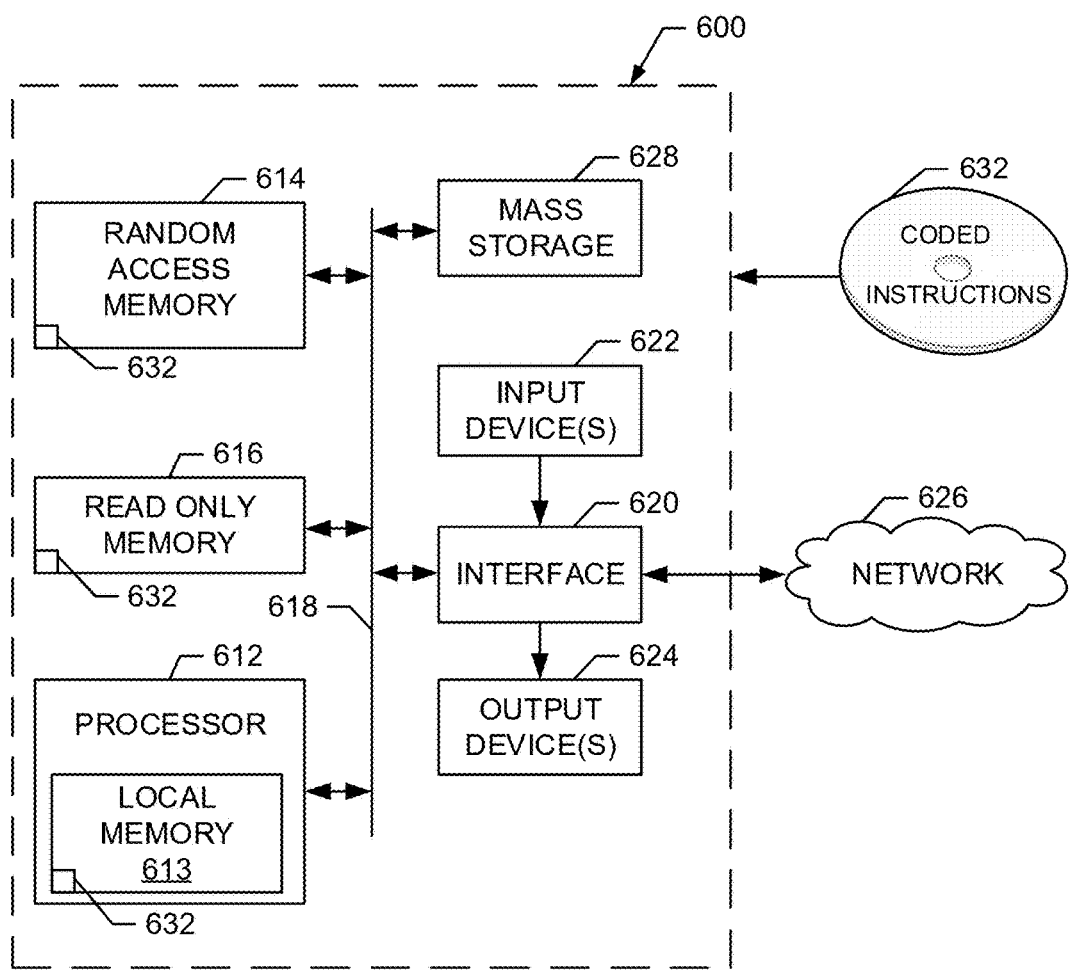
FIG. 6 is a schematic block diagram illustrating a suitable operating environment.
Figure 7:
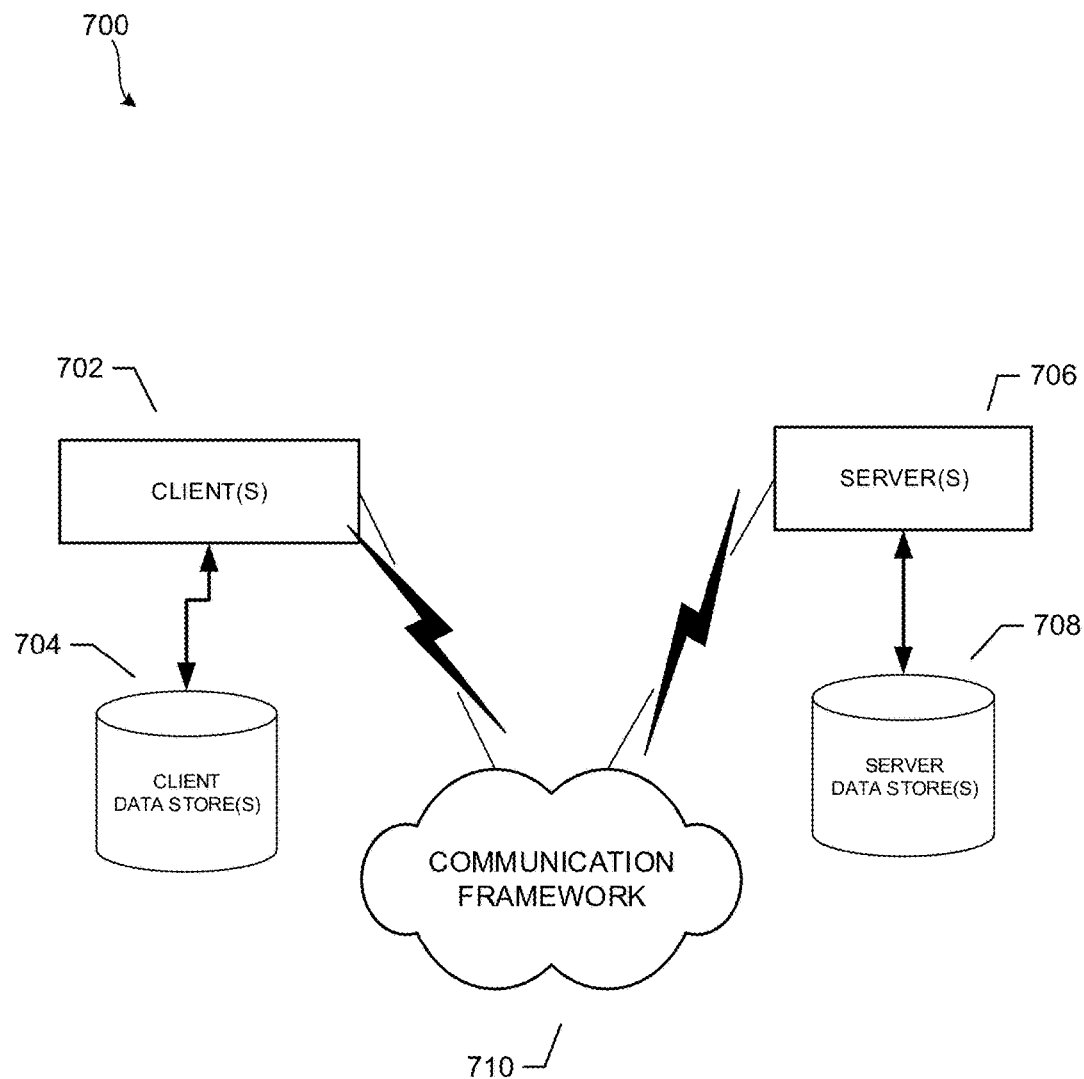
FIG. 7 is a schematic block diagram of a sample-computing environment.

In order to provide a context for the various aspects of the disclosed subject matter, FIGS. 6 and 7 as well as the following discussion are intended to provide a brief, general description of a suitable environment in which the various aspects of the disclosed subject matter may be implemented.

FIG. 6 is a block diagram of an example processor platform 600 capable of executing the instructions of FIG. 2 to implement the example cross domain context sharing engine. The processor platform 600 can be, for example, a server, a personal computer, a mobile device (e.g., a cell phone, a smart phone, a tablet such as an IPAD™), a personal digital assistant (PDA), an Internet appliance, or any other type of computing device.

The processor platform 600 of the illustrated example includes a processor 612. Processor 612 of the illustrated example is hardware. For example, processor 612 can be implemented by one or more integrated circuits, logic circuits, microprocessors or controllers from any desired family or manufacturer.

Processor 612 of the illustrated example includes a local memory 613 (e.g., a cache). Processor 612 of the illustrated example is in communication with a main memory including a volatile memory 614 and a non-volatile memory 616 via a bus 618. Volatile memory 614 can be implemented by Synchronous Dynamic Random Access Memory (SDRAM), Dynamic Random Access Memory (DRAM), RAMBUS Dynamic Random Access Memory (RDRAM) and/or any other type of random access memory device. The nonvolatile memory 616 can be implemented by flash memory and/or any other desired type of memory device. Access to main memory 614, 616 is controlled by a memory controller.

Processor platform 600 of the illustrated example also includes an interface circuit 620. Interface circuit 620 can be implemented by any type of interface standard, such as an Ethernet interface, a universal serial bus (USB), and/or a PCI express interface.

In the illustrated example, one or more input devices 622 are connected to the interface circuit 620. Input device(s) 622 permit(s) a user to enter data and commands into processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to interface circuit 620 of the illustrated example. Output devices 624 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). Interface circuit 620 of the illustrated example, thus, typically includes a graphics driver card, a graphics driver chip or a graphics driver processor.

Interface circuit 620 of the illustrated example also includes a communication device such as a transmitter, a receiver, a transceiver, a modem and/or network interface card to facilitate exchange of data with external machines (e.g., computing devices of any kind) via a network 426 (e.g., an Ethernet connection, a digital subscriber line (DSL), a telephone line, coaxial cable, a cellular telephone system, etc.).

Processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

Coded instructions 632 of FIG. 2 can be stored in mass storage device 628, in volatile memory 614, in the non-volatile memory 616, and/or on a removable tangible computer readable storage medium such as a CD or DVD.

FIG. 7 is a schematic block diagram of a sample-computing environment 700 with which the subject matter of this disclosure can interact. The system 700 includes one or more client(s) 702. The client(s) 702 can be hardware and/or software (e.g., threads, processes, computing devices). The system 700 also includes one or more server(s) 706. Thus, system 700 can correspond to a two-tier client server model or a multi-tier model (e.g., client, middle tier server, data server), amongst other models. The server(s) 706 can also be hardware and/or software (e.g., threads, processes, computing devices). The servers 706 can house threads to perform transformations by employing this disclosure, for example. One possible communication between a client 702 and a server 706 may be in the form of a data packet transmitted between two or more computer processes.

The system 700 includes a communication framework 710 that can be employed to facilitate communications between the client(s) 702 and the server(s) 706. The client(s) 702 are operatively connected to one or more client data store(s) 704 that can be employed to store information local to the client(s) 702. Similarly, the server(s) 706 are operatively connected to one or more server data store(s) 708 that can be employed to store information local to the servers 706.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components, as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A cross-domain context sharing system, comprising:
a memory that stores computer executable components;
a processor that executes the computer executable components;
a first application component, residing in the memory and executed by the processor, that sets a property on a local storage component and publishes an event, the first application component including a first context application programming interface, and wherein the first context application programming interface is initialized to a first domain; and a second application component, residing in the memory and executed by the processor, including an iframe component and a second context application programming interface, the iframe component to receive the published event, and wherein the second context application programming interface is also initialized to the first domain; and wherein the iframe component is to instantiate a first event listener and a second event listener, the first event listener to process messages from the first context application programming interface and the second event listener to process messages from the second context application programming interface, the iframe component to synchronize a second context of the second application component with a first context of the first application component based on a message including the published event processed via the first event listener; and wherein the iframe component is not instantiated when the first context application programming interface makes an active determination that its current domain and the first domain are the same; and wherein the iframe component is dynamically inserted into the second application component by a web component library when the second context application programming interface makes an active determination that its monitored current domain and the first domain are not the same; and wherein the first context application programming interface and the second context application programming interface facilitate a plurality of types of application residing in the separate domains to transform their corresponding application states by initiating communications regarding proposed topics and receiving subsequent responses to the proposed topics via the instantiated iframe component.

2. The cross-domain context sharing system of claim 1, wherein the first application component establishes a connection to a first Webserver.

3. The cross-domain context sharing system of claim 1, wherein the iframe component establishes a connection to a first Webserver.

4. The cross-domain context sharing system of claim 3, wherein the iframe component of the second application component establishes a connection to a web page on the first web server.

5. The cross-domain context sharing system of claim 1, wherein the iframe component receives code to allow for cross-domain communication.

6. A method, comprising:
setting a property, by a system including a processor, on a local storage component;
publishing an event, by the system, from a first application component, the first application component including a first context application programming interface, and wherein the first context application programming interface is initialized to a first domain;
receiving, at a second application component, the published event via an iframe component, the second application component including a second context application programming interface and the iframe component and wherein the second context application programming interface is also initialized to the first domain; and wherein the iframe component is to instantiate a first event listener and a second event listener, the first event listener to process messages from the first context application programming interface and the second event listener to process messages from the second context application programming interface, the iframe component to synchronize a second context of the second application component with a first context of the first application component based on a message including the published event processed via the first event listener; and wherein the iframe component is not instantiated when the first context application programming interface makes an active determination that its current domain and the first domain are the same; and wherein the iframe component is dynamically inserted into the second application component by a web component library when the second context application programming interface makes an active determination that its monitored current domain and the first domain are not the same; and wherein the first context application programming interface and the second context programming interface facilitate a plurality of types of applications residing in the separate domains to transform their corresponding application states by initiating communications regarding proposed topics and receiving subsequent responses to the proposed topics via the instantiated iframe component.

7. The method of claim 6, wherein the first application component is connected to a first Webserver.

8. The method of claim 6, wherein the second application component the iframe component establishes a connection to the first Webserver.

9. The method of claim 6, wherein the iframe component of the second application component is connected to a web page on a first Webserver.

10. The method of claim 6, wherein the iframe component receives code to allow for cross domain communication.

11. A computer readable mass storage device comprising instructions that, in response to execution, cause a system comprising a processor to perform operations including at least:
setting a property, by a system comprising a processor, on a local storage component;
publishing an event, by the system, from a first application, the first application component including a first context application programming interface, and wherein the first context application programming interface is initialized to a first domain;
receiving, at a second application, the second application component including a second context application programming interface, the published event via an iframe component and wherein the second context application programming interface is also initialized to the first domain; and wherein the iframe component instantiates a first event listener and a second event listener, the first event listener to process messages from the first context application programming interface and the second event listener to process messages from the second context application programming interface, the iframe component to synchronize a second context of the second application with a first context of the first application based on a message including the published event processed via the first event listener; and wherein the iframe component is not instantiated when the first context application programming interface makes an active determination that its current domain and the first domain are the same; and wherein the iframe component is dynamically inserted into the second application component by a web component library when the second context application programming interface makes an active determination that its monitored current domain and the first domain are not the same; and wherein the first context application programming interface and the second context application programming interface facilitate a plurality of types of applications residing in the separate domains to transform their corresponding application states by initiating communications regarding proposed topics and receiving subsequent responses to the proposed topics via the instantiated iframe component.

12. The computer readable mass storage device of claim 11, wherein the first application component is connected to a first web server.

13. The computer readable mass storage device of claim 11, wherein the iframe component establishes a connection to a first Webserver.

14. The computer readable mass storage device of claim 11, wherein the iframe component of the second application component is connected to a web page on a first Webserver.

15. The computer readable storage device of claim 11, wherein the iframe component receives code to allow for cross-domain communication.

\* \* \* \* \*